(12) United States Patent
Hioda

(10) Patent No.: US 10,800,369 B2
(45) Date of Patent: Oct. 13, 2020

(54) REAR SEAT SIDE AIRBAG DEVICE

(71) Applicant: TOYOTA JIDOSHA KABUSHIKI KAISHA, Toyota-shi, Aichi-ken (JP)

(72) Inventor: Seiji Hioda, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 16/028,721

(22) Filed: Jul. 6, 2018

(65) Prior Publication Data

US 2019/0077355 A1 Mar. 14, 2019

(30) Foreign Application Priority Data

Sep. 8, 2017 (JP) ................................. 2017-173229

(51) Int. Cl.
| | | |
|---|---|---|
| *B60R 21/207* | (2006.01) | |
| *B60R 21/26* | (2011.01) | |
| *B60R 21/2165* | (2011.01) | |
| *B60R 21/00* | (2006.01) | |
| *B60R 21/215* | (2011.01) | |

(52) U.S. Cl.
CPC ........ *B60R 21/207* (2013.01); *B60R 21/2165* (2013.01); *B60R 21/26* (2013.01); *B60R 2021/0032* (2013.01); *B60R 2021/2078* (2013.01); *B60R 2021/21537* (2013.01)

(58) Field of Classification Search
CPC .................. B60R 21/207; B60R 21/20; B60R 2021/2078; B60R 21/215; B60R 21/26; B60R 21/2165; B60R 2021/0032; B60R 2021/21537

USPC .................................................... 280/728.2
See application file for complete search history.

(56) References Cited

U.S. PATENT DOCUMENTS

| | | | | |
|---|---|---|---|---|
| 5,803,487 A | * | 9/1998 | Kikuchi ................ | B60R 21/205 280/728.2 |
| 2003/0085555 A1 | * | 5/2003 | Segura ................ | B29C 45/0081 280/728.3 |
| 2004/0140652 A1 | * | 7/2004 | Takahashi ........... | B29C 45/0081 280/728.3 |
| 2005/0253369 A1 | * | 11/2005 | Taoka ................... | B60R 21/231 280/752 |

(Continued)

FOREIGN PATENT DOCUMENTS

| | | |
|---|---|---|
| JP | H08-085406 A | 4/1996 |
| JP | H11-042998 A | 2/1999 |

(Continued)

OTHER PUBLICATIONS

Machine Translation of JP-2003137054-A (Year: 2003).*

Primary Examiner — Paul N Dickson
Assistant Examiner — Kurtis Nielson
(74) Attorney, Agent, or Firm — Oliff PLC

(57) ABSTRACT

A rear seat side airbag device includes a case disposed at a vehicle rear side of a cabin-side wall portion of a seat side garnish. The seat side garnish is disposed between a vehicle side portion and a seatback of a rear seat. The case has an opening portion that opens toward the cabin-side wall portion, and houses an airbag module main body. An airbag door covers the opening portion and is surrounded by a tear portion and a hinge portion formed at regions corresponding to the opening portion. A spacer is disposed on the airbag door and projects out into the case.

9 Claims, 7 Drawing Sheets

(56) References Cited

U.S. PATENT DOCUMENTS

| | | | | |
|---|---|---|---|---|
| 2006/0061073 A1* | 3/2006 | Naruse | ................... | B60R 21/21 |
| | | | | 280/730.2 |
| 2008/0136144 A1* | 6/2008 | Spahr | ................... | B60R 21/205 |
| | | | | 280/728.3 |
| 2016/0009247 A1* | 1/2016 | Fujiwara | ............. | B60R 21/2171 |
| | | | | 280/728.2 |
| 2016/0009248 A1* | 1/2016 | Tanabe | ................. | B60R 21/276 |
| | | | | 280/728.2 |
| 2016/0068129 A1* | 3/2016 | Tanabe | ................. | B60R 21/216 |
| | | | | 280/728.3 |

FOREIGN PATENT DOCUMENTS

| | | | |
|---|---|---|---|
| JP | 2003137054 A | * | 5/2003 |
| JP | 2006-088850 A | | 4/2006 |
| JP | 2010-120407 A | | 6/2010 |
| JP | 2016-020148 A | | 2/2016 |
| JP | 2016-037127 A | | 3/2016 |

* cited by examiner

REAR SEAT SIDE AIRBAG DEVICE

CROSS-REFERENCE TO RELATED APPLICATION

This application is based on and claims priority under 35 USC 119 from Japanese Patent Application No. 2017-173229 filed on Sep. 8, 2017, which is incorporated by reference herein.

BACKGROUND

Technical Field

The present disclosure relates to a rear seat side airbag device.

Related Art

Japanese Patent Application Laid-Open (JP-A) No. 2006-088850 discloses a side airbag device. This side airbag device is accommodated within a case that is provided at a seat side garnish (hereinafter called "side garnish") that is provided between the seatback of a rear seat and a vehicle side portion. The airbag door, which is surround by a tear portion and a hinge portion, is formed the cabin-side wall portion of the side garnish. Further, at the time of a vehicle collision, the airbag that inflates opens the airbag door while rupturing the tear portion from the interior of the case, and, due thereto, the airbag is inflated and expanded between the vehicle side portion and a passenger who is seated in the rear seat.

However, in the structure disclosed in JP-A No. 2006-088850, the side airbag device is at a position that is relatively close, in the vehicle longitudinal direction, to the passenger. Therefore, when the airbag inflates and expands, the region at the airbag where the vehicle transverse direction dimension (hereinafter called "thickness") becomes the largest is positioned further toward the vehicle front side than the passenger. Thus, there is the possibility that the passenger restraining performance will deteriorate. In order to address this, it is thought to place the design surface of the rear seat toward the vehicle front side with respect to the side garnish, and to move the passenger toward the vehicle front side. However, because the external appearance becomes such that the side garnish and the design surface of the rear seat are not continuous, the appearance design deteriorates. Further, it is also thought to place the side airbag device further toward the vehicle rear side than the side garnish, but, in this case, the volume of the case interior increases, and therefore, there is the possibility that a delay will arise at the time when the airbag inflates and expands from the interior of the case toward the vehicle cabin interior. Moreover, it is also thought that, by adding a tether to the airbag and making the airbag be a shape that is planar when the airbag is inflated, the region of the airbag where the thickness becomes the largest will be disposed at the side of the passenger, but, in this case, the structure of the airbag becomes complex. Accordingly, there is room for improvement with regard to these points in the above-described art.

SUMMARY OF INVENTION

An aspect of a rear seat side airbag device includes: an airbag module main body that includes a side airbag, which is inflated and expanded at a side of a position of a passenger at a rear seat at a time of a vehicle collision, and an inflator that supplies gas to an interior of the side airbag; a case that is provided at a vehicle rear side of a cabin-side wall portion, a plate thickness direction of which is a substantially vehicle longitudinal direction, of a seat side garnish disposed between a vehicle side portion and a seatback of the rear seat, that has an opening portion that opens toward the cabin-side wall portion, and that houses the airbag module main body; an airbag door that covers the opening portion, and that is surrounded by a tear portion and a hinge portion that are formed at regions corresponding to the opening portion; and a spacer that is provided at the airbag door and projects out into the case.

DESCRIPTION OF EMBODIMENTS

Figure 1:
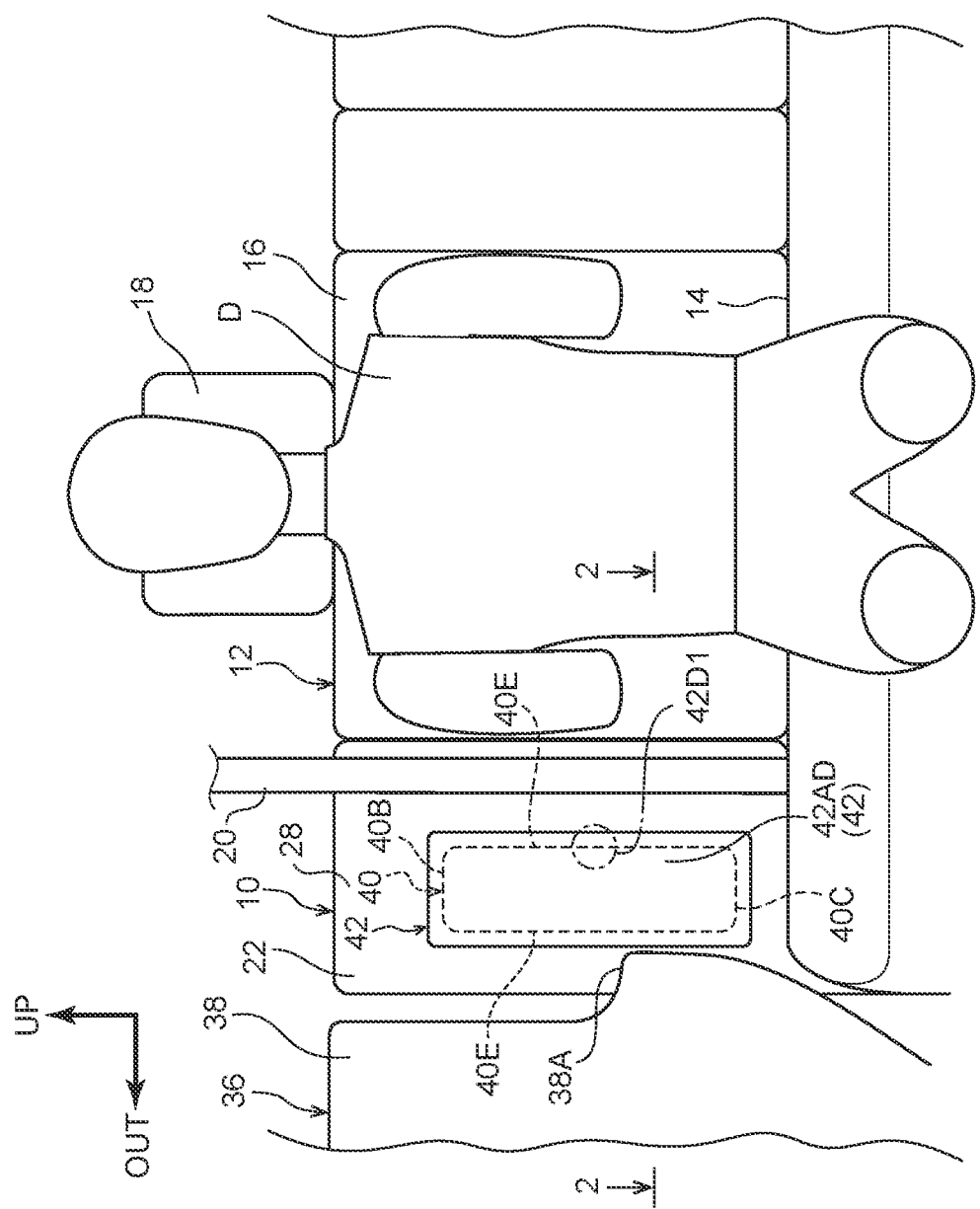
FIG. 1 is a vehicle front view showing a side garnish and a rear seat before operation of a rear seat side airbag device relating to a first embodiment.

Examples of forms for implementing the present disclosure are described in detail hereinafter with reference to the drawings. Note that arrow FR that is shown in the drawings indicates the vehicle longitudinal direction front side, arrow OUT indicates a vehicle transverse direction outer side, and arrow UP indicates the vehicle vertical direction upper side.

First Embodiment

A front view in which a rear seat 12, to which is applied a rear seat side airbag device 10 relating to the present embodiment, is seen from the vehicle front side, is shown in FIG. 1. Further, FIG. 1 illustrates a state in which a crash test dummy (mannequin), which serves as a model of a passenger who is to be protected, is seated on a seat cushion 14 of the rear seat 12. The dummy is, for example, an AF05 (5th percentile U.S. adult female) World SID (internationally standardized side crash dummy: World Side Impact Dummy). This dummy is seated in a standard seated posture that is prescribed by crash test methods, and the rear seat 12 is positioned at a standard set position that corresponds to this seated posture. Hereinafter, in order to make the explanation easy to understand, the dummy is called "passenger D".

As shown in FIG. 1, the rear seat 12 is structured so as to include the seat cushion 14 and a seatback 16. A headrest 18 for supporting the head portion of the passenger D is provided at the upper end portion of the seatback 16. A webbing (belt) 20 for restraining the passenger D is disposed at the side of the passenger D. The webbing 20 extends in the vehicle vertical direction, and one end portion of the webbing 20 is fixed to a belt anchor that is mounted to the vehicle floor. On the other hand, the other end portion of the webbing 20 is taken-up on a retractor that is installed in an upper back panel. The webbing 20 is inserted-through a tongue plate that is attached to a buckle.

Here, side garnishes 22 are provided at both end sides of the seatback 16 of the rear seat 12 along the vehicle transverse direction. The rear seat side airbag devices 10 are assembled to these side garnishes 22. Note that FIG. 1 illustrates only the side garnish 22 and the rear seat side airbag device 10 that are at the vehicle right side of the seatback 16, but the side garnish 22 and the rear seat side airbag device 10 are provided similarly at the vehicle left side of the seatback 16 as well. Further, because the rear seat side airbag device 10 at the vehicle right side and the rear seat side airbag device 10 at the vehicle left side have left-right symmetry, in the following description, only the rear seat side airbag device 10 at the vehicle right side is described.

Figure 2:
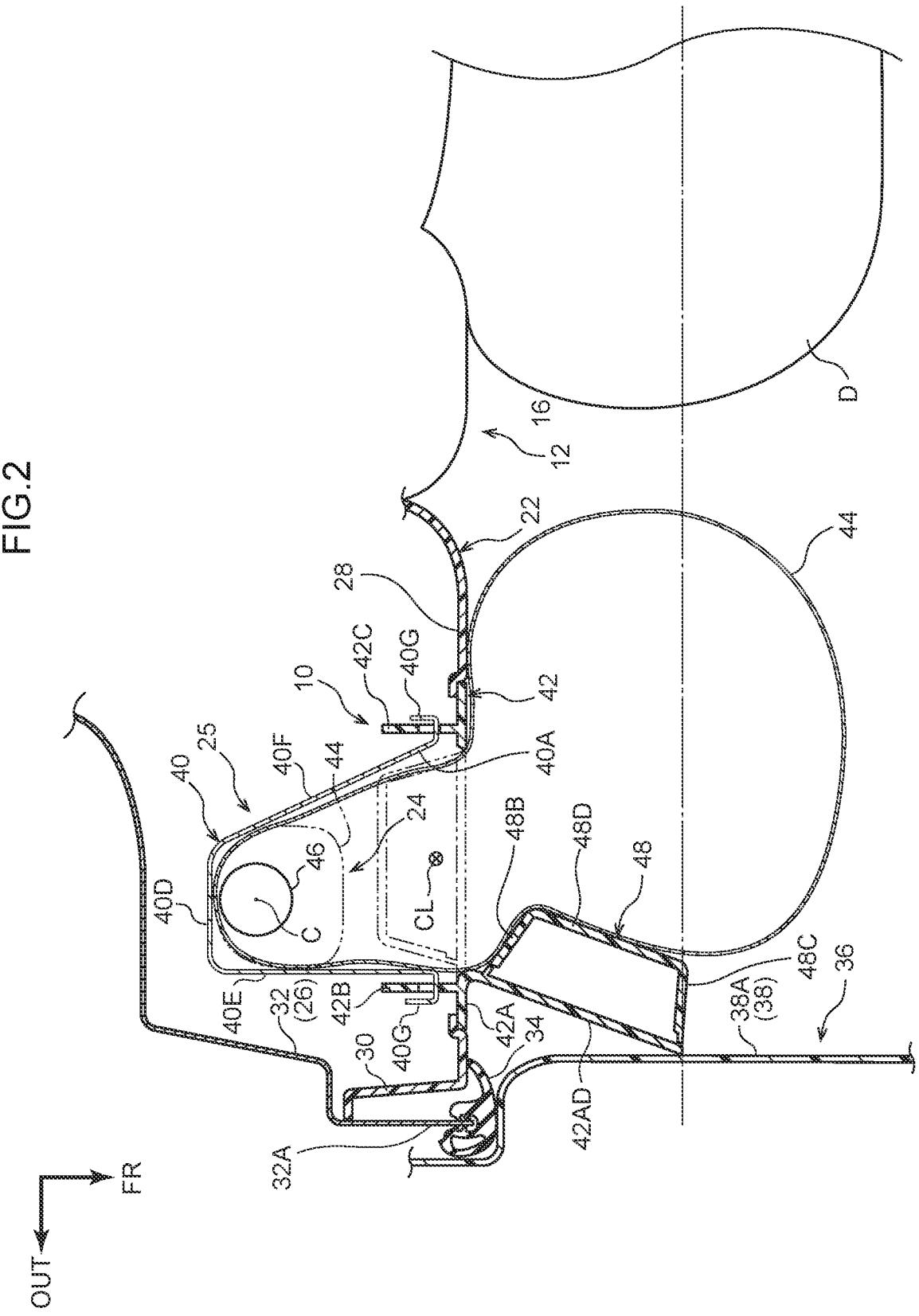
FIG. 2 is an enlarged sectional view that is cut along line 2-2 of FIG. 1 and shows a state after operation of the rear seat side airbag device relating to the first embodiment.

As shown in FIG. 2, the side garnish 22 is provided between the side of the seatback 16 and a wheel house 26, and is formed of resin. The side garnish 22 has a cabin-side wall portion 28 that is formed continuously with the vehicle front side surface of the design surface of the seatback 16 and whose plate thickness direction is substantially the vehicle longitudinal direction. Further, the side garnish 22 has an outer side wall portion 30 that extends toward the vehicle rear side from the vehicle transverse direction outer side end portion of the cabin-side wall portion 28, and whose distal end is bent toward the vehicle transverse direction outer side and abuts a wheel house inner panel 32 that is described later. Moreover, the rear seat side airbag device 10 is assembled to the vehicle transverse direction substantial center of the cabin-side wall portion 28 at the side garnish 22. The rear seat side airbag device 10 is described later.

The wheel house 26 is structured to include the wheel house inner panel 32 that structures an inner plate, and an unillustrated wheel house outer panel that structures an outer plate. The wheel house inner panel 32 extends in the vehicle longitudinal direction along the side portion, which is at the vehicle transverse direction outer side, of the rear seat side airbag device 10, and bulges-out toward the vehicle transverse direction inner side at further toward the vehicle rear side than the rear seat side airbag device 10. Further, an inner side flange 32A is formed at the front end portion of the wheel house inner panel 32. A trim seal 34 is mounted to the joined portion of this inner side flange 32A and an outer side flange of the wheel house outer panel.

A rear side door 36 is disposed further toward the vehicle front side than the wheel house 26. The rear side door 36 is structured to include a door inner panel that structures an inner plate, and a door outer panel that structures an outer plate. A door trim 38 that is made of resin and is an interior finishing part is mounted to the vehicle left side of the door inner panel. An arm rest 38A that juts-out toward the vehicle left side is provided at the door trim 38 (see FIG. 1).

The rear seat side airbag device 10 that is assembled to the side garnish 22 is structured to include an airbag module 25 and a door garnish 42. The airbag module 25 is disposed between the side portion of the seatback 16 and the wheel house 26.

The airbag module 25 is structured to include an airbag module main body 24 that is structured to include an airbag 44 and an inflator 46, and a case 40 that is mounted to the side garnish 22 and accommodates the airbag module main body 24 at the interior thereof. An opening portion 40A that will be described later of the case 40 is covered by the door garnish 42.

The airbag 44 is formed in the shape of a bag, and, at the time of a vehicle collision, is inflated and expanded at the side of the passenger D and protects the passenger D. Further, the airbag 44 of the present embodiment is accommodated within the case 40 in a folded-up state, before being inflated and expanded. Note that the way of folding the airbag 44 is not particularly limited, and the airbag 44 may be folded-up in the form of bellows or in the form of a roll. Further, the airbag 44 may be accommodated without being folded-up.

A combustion type or cold gas type inflator is used as the inflator 46. Gas that is generated due to the inflator 46 being operated is supplied into the airbag 44. In the present embodiment, the inflator 46 is a cylindrical type inflator, and is disposed such that the length direction thereof is substantially the vehicle vertical direction. Plural gas jet-out ports are formed in the lower end portion of the inflator 46 along the peripheral surface thereof. Due to the inflator 46 being operated, gas is jetted-out from the gas jet-out ports. Note that, in the present embodiment, the inflator 46 is a cylindrical type inflator, but is not limited to this and may be a disk type inflator.

Moreover, the inflator 46 is electrically connected to an ECU (Electronic Control Unit) that is a control section, and is operated by the ECU at the time of a collision of the vehicle.

The case 40 that accommodates the airbag module main body 24 is formed in the shape of a box whose vehicle front side is open (i.e., that has the opening portion 40A at the vehicle front side thereof). An upper wall 40B and a lower wall 40C are provided respectively at the upper end portion and the lower end portion of the case 40 (see FIG. 1). The upper wall 40B is disposed at the vehicle upper side of the airbag module main body 24 and structures the upper surface of the case 40. The lower wall 40C is disposed at the vehicle lower side of the airbag module main body 24 and structures the lower surface of the case 40.

Figure 3:
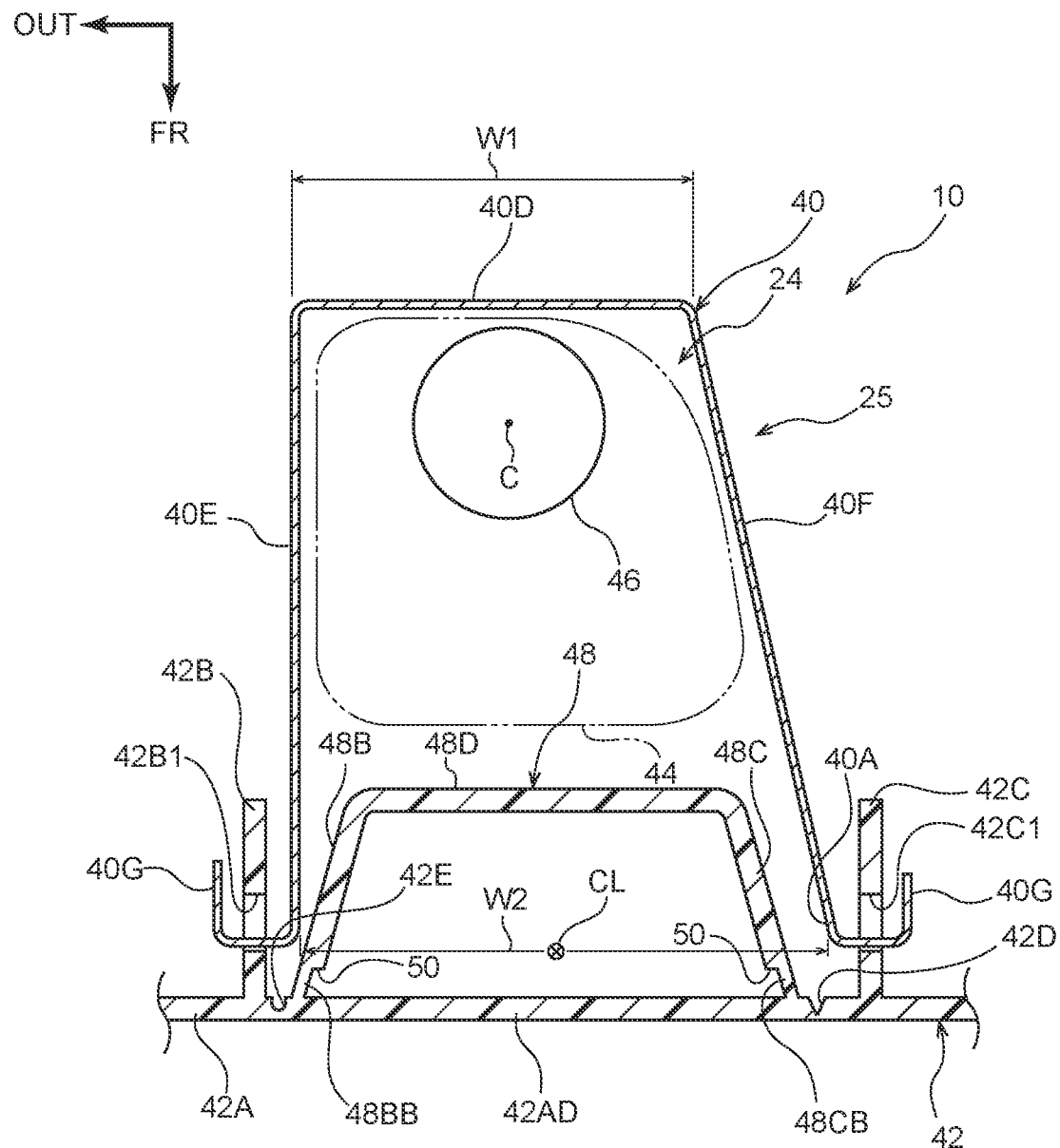
FIG. 3 is an enlarged plan sectional view showing, in an enlarged manner, a case at the rear seat side airbag device relating to the first embodiment.

A bottom wall 40D, which connects the rear ends of the upper wall 40B and the lower wall 40C together, is provided at the vehicle rear side of the airbag module main body 24 at the case 40. This bottom wall 40D is structured so as to support, from the vehicle rear side, the airbag 44 that is in an expanded state. Note that the inflator 46 is disposed at the vehicle transverse direction substantially central portion of the bottom wall 40D. Further, as shown in FIG. 3, a side wall 40E and a side wall 40F extend-out toward the vehicle front side from the vehicle transverse direction both end portions of the bottom wall 40D. The side wall 40E and the side wall 40F are disposed so as to face one another in the vehicle transverse direction. The side wall 40E extends-out toward the vehicle front side from the vehicle transverse direction outer side end portion of the bottom wall 40D. On the other hand, the side wall 40F extends-out toward the vehicle front side from the vehicle transverse direction inner side end portion of the bottom wall 40D. The side wall 40F extends-out so as to be inclined toward the vehicle transverse direction inner side while heading toward the vehicle front side. Accordingly, dimension W2 of the opening portion 40A of the case 40 in the vehicle transverse direction is greater than dimension W1 of the bottom wall 40D in the vehicle transverse direction, and a vehicle transverse direction center CL at the opening portion 40A of the case 40 is disposed at the vehicle transverse direction inner side with respect to a center C of the inflator 46. Note that the dimension W2 of the opening portion 40A in the vehicle transverse direction is greater than the dimension, in the vehicle transverse direction, of the opening portion at a case of which the side wall has only the minimum needed draft angle. As an example, the dimension W2 of the opening portion 40A in the vehicle transverse direction is set to a size that is approximately 1.1 times or more the dimension W1 of the bottom wall 40D in the vehicle transverse direction.

Anchor claws 40G are formed at the side wall 40E and the side wall 40F, respectively. The respective anchor claws 40G extend from the front end edge of the side wall 40E toward the outer side, and further, are bent toward the vehicle rear side. Therefore, the anchor claw 40G is formed in a substantial L-shape (or a substantial J-shape) as seen in a vehicle plan view. Further, the anchor claws 40G are anchored on the door garnish 42. Note that the bottom wall 40D of the case 40 and the wheel house inner panel 32 (see FIG. 2) are fastened together by brackets, and, due thereto, the case 40 is fixed to the wheel house 26 (see FIG. 2).

The door garnish 42 is disposed at the vehicle front side of the case 40. The airbag module 25 is covered by the door garnish 42 from the vehicle cabin side. The door garnish 42 is structured to include a lateral wall portion 42A that extends in the vehicle transverse direction as seen in a vehicle plan sectional view, and a vertical wall portion 42B and a vertical wall portion 42C that extend toward the vehicle rear side from the lateral wall portion 42A. Further, the vertical wall portion 42B and the vertical wall portion 42C are disposed so as to face one another in the vehicle transverse direction. The vertical wall portion 42B extends-out toward the vehicle rear side from further toward the vehicle transverse direction outer side than the vehicle transverse direction central portion of the lateral wall portion 42A. On the other hand, the vertical wall portion 42C extends-out toward the vehicle rear side from further toward the vehicle transverse direction inner side than the vehicle transverse direction central portion of the lateral wall portion 42A.

Here, an anchor hole 42B1 is formed in the lateral wall portion 42B. The anchor claw 40G that is formed at the side wall 40E of the case 40 is anchored in this anchor hole 42B1. Further, an anchor hole 42C1 is formed in the vertical wall portion 42C. The anchor claw 40G that is formed at the side wall 40F of the case 40 is anchored in this anchor hole 42C1.

The lateral wall portion 42A is formed in a substantially rectangular shape whose length direction is the vehicle vertical direction as seen in a vehicle front view (see FIG. 1). Further, a tear portion 42D that is thin-walled is formed in a vicinity of the root portion of the vertical wall portion 42C at the lateral wall portion 42A. This tear portion 42D is a planned breaking portion that breaks due to the inflation pressure of the airbag 44. Moreover, a hinge portion 42E that is thin-walled is formed at the root portion of the vertical wall portion 42B at the lateral wall portion 42A. The thickness of this hinge portion 42E is formed to be thicker than that of the tear portion 42D. The tear portion 42D and the hinge portion 42E are formed at positions corresponding to the opening portion 40A, and, in detail, are formed so as to run along the outer edge of the opening portion 40A. Further, the tear portion 42D is formed in an approximate C-shape as seen in a vehicle front view, and the hinge portion 42E is formed in the shape of a straight line that runs substantially along the vehicle vertical direction, as seen in a vehicle front view. Note that a rupture starting point 42D1 is provided at the vehicle vertical direction substantially central portion of the region, which runs substantially along the vehicle vertical direction, of the tear portion 42D. This rupture starting point 42D1 is formed so as to be thinner-walled than the other regions of the tear portion 42D, and is the region that initially breaks at the tear portion 42D.

Here, the portion, which is between the tear portion 42D and the hinge portion 42E, at the lateral wall portion 42 is an airbag door 42AD that opens due to the inflation pressure of the airbag 44. Namely, when the tear portion 42D breaks at the time of inflation and expansion of the airbag 44, the hinge portion 42E becomes a hinge, and the airbag door 42AD opens toward the vehicle front side and the vehicle transverse direction outer side around the hinge portion 42E. Then, the airbag door 42AD abuts the arm rest 38A of the door trim 38 (see FIG. 2).

A spacer 48 that projects-out toward the interior of the case 40 is formed at the airbag door 42AD of the door garnish 42. The spacer 48 is formed integrally with the airbag door 42AD. In detail, the spacer 48 is structured to include a side wall portion 48B and a side wall portion 48C that extend from the reverse surface of the airbag door 42AD substantially toward the vehicle rear side, and a rear wall portion 48D that connects the respective distal end portions of the side wall portion 48B and the side wall portion 48D together in the vehicle transverse direction. The interior of the spacer 48 is hollow. The side wall portion 48B extends-out, while tilting toward the vehicle transverse direction inner side while heading toward the vehicle rear side, from further toward the vehicle transverse direction outer side than the vehicle transverse direction central portion of the lateral wall portion 42A. On the other hand, the side wall portion 48C extends out, while tilting toward the vehicle transverse direction outer side while heading toward the vehicle rear side, from further toward the vehicle transverse direction inner side than the vehicle transverse direction central portion of the lateral wall portion 42A. Due to the above-described structure, the hinge portion 42E is provided at the vehicle transverse direction outer side with respect to the side wall portion 48B, i.e., the spacer 48. On the other hand, the tear portion 42D is provided at the vehicle transverse direction inner side with respect to the side wall portion 48C, i.e., the spacer 48. Note that the tear portion 42D is disposed adjacent to a proximal end portion 48CB of the side wall portion 48C that serves as the vehicle transverse direction inner side end portion of the spacer 48.

Notch portions 50 are formed respectively in a proximal end portion 48BB of the side wall portion 48B and in the proximal end portion 48CB of the side wall portion 48C. Due thereto, the proximal end portion 48BB and the proximal end portion 48CB are thin-walled.

(Operation/Effects of First Embodiment)

Figure 4:
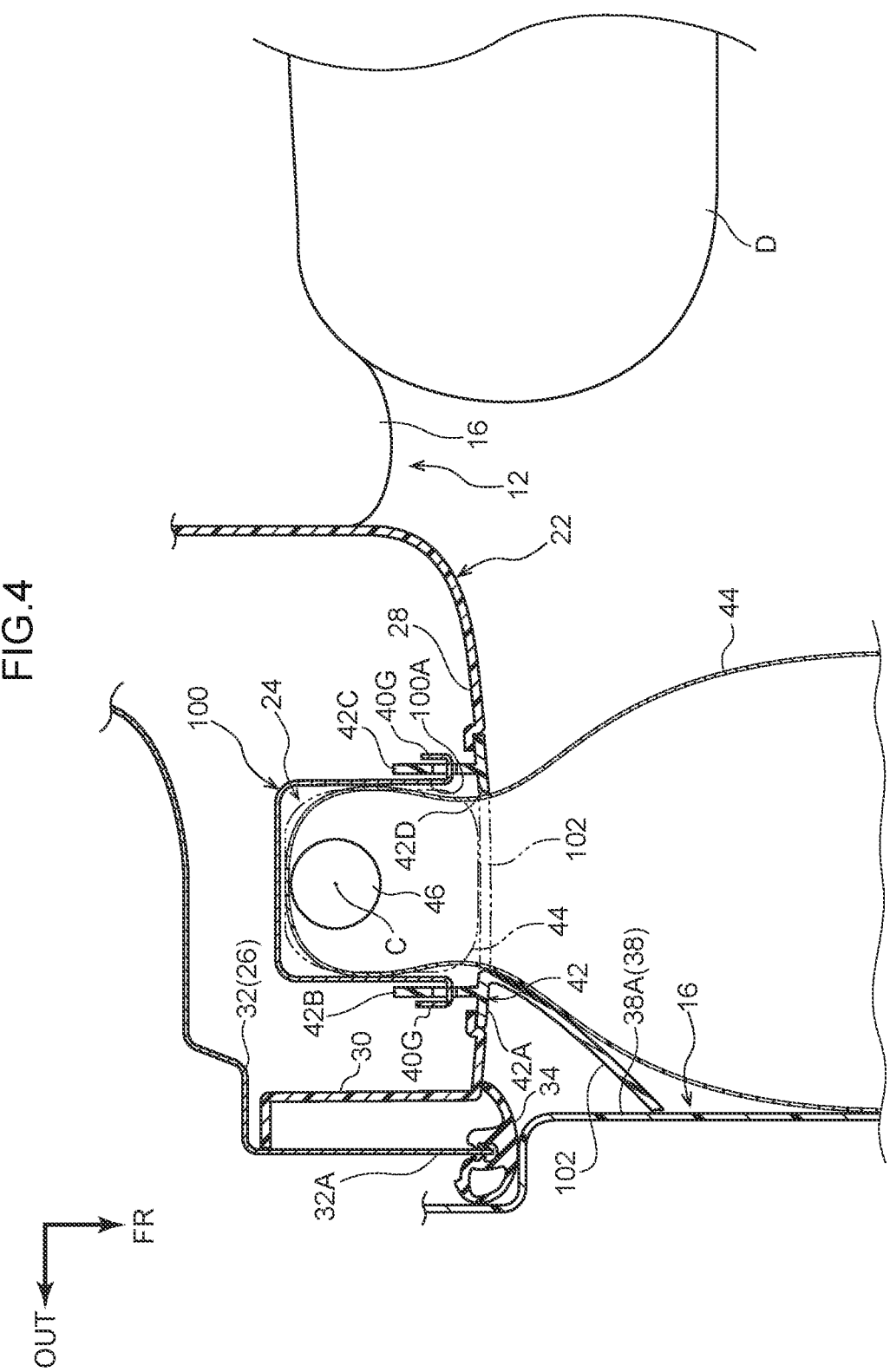
FIG. 4 is an enlarged sectional view that corresponds to FIG. 2 and shows a rear seat side airbag device relating to a comparative example.

Here, operation and effects of the present embodiment are described by using the comparative example that is shown in FIG. 4. Note that structural portions that are the same as those of the present embodiment are denoted by the same numerals, and description thereof is omitted.

As shown in FIG. 4, a case 100, which has an opening portion 100A that opens toward the cabin-side wall portion 28, is mounted to the cabin-side wall portion 28 whose plate thickness direction is the substantially vehicle longitudinal direction at the side garnish 22. The airbag module main body 24 that is structured to include the airbag 44, which inflates and expands at the side of the passenger D at the time of a vehicle collision, and the inflator 46, which supplies gas to the airbag 44 interior, is accommodated at the interior of this case 100. Further, at the time of a vehicle collision, due to the airbag door 102 opening while the inflated airbag 44 ruptures the tear portion 42D from the case 100 interior, the airbag 44 is inflated and expanded between the door trim 38 and the passenger D who is seated in the rear seat 12. Note that the volume of the case 100 is set to a volume of an extent such that the inflation and expansion of the airbag 44 is not later than a preset time. In this case, the airbag module main body 24 that is within the case 100 and the passenger D are positioned relatively close in the vehicle longitudinal direction. Accordingly, when the airbag 44 inflates and expands at the time of a vehicle collision, the region where the thickness becomes the greatest at the airbag 44 is positioned further toward the vehicle front side than the passenger D (the thickness of the airbag 44 becomes thin at the side of the passenger D), and therefore, there is the possibility that the passenger D restraining performance will deteriorate.

In contrast, in accordance with the present embodiment, as shown in FIG. 2, the case 40, which has the opening portion 40A which opens toward the cabin-side wall portion 28, is mounted to the vehicle rear side of the cabin-side wall portion 28, whose plate thickness direction is the substantially vehicle longitudinal direction, at the side garnish 22 that is disposed between the seatback 16 of the rear seat 12 and the vehicle side portion. The airbag module main body 24 that is structured to include the airbag 44, which inflates and expands at the side of the passenger D at the time of a vehicle collision, and the inflator 46, which supplies gas to the airbag 44, is accommodated within this case 40. Further, the airbag door 42AD, which covers the opening portion 40A of the case and which is formed at a region corresponding to the opening portion 40A of the case 40 and which is surrounded by the tear portion 42D and the hinge portion 42E that are formed at regions corresponding to the opening portion 40A of the case 40, is provided. The spacer 48 is provided at the airbag door 42AD, and the spacer 48 projects-out into the case 40. Accordingly, the volume of the interior of the case 40 can be reduced by an amount corresponding to the spacer 48. Therefore, due to the airbag module main body 24 being disposed further toward the vehicle rear side than the side garnish 22, even if the region where the thickness is the largest at the airbag 44 at the time of inflation and expansion is positioned at the side of the passenger D, a delay in the inflation and expansion of the airbag 44 due to an increase in volume of the case 40 interior can be suppressed. Due thereto, the passenger D restraining performance can be improved.

Further, the spacer 48 is formed at the vehicle rear side surface of the airbag door 42AD, and the hinge portion 42E is provided at the vehicle transverse direction outer side with respect to the spacer 48, and the tear portion 42D is provided at the vehicle transverse direction inner side with respect to the spacer 48. Accordingly, at the time of inflation and expansion of the airbag 44, the airbag door 42AD opens toward the vehicle transverse direction outer side together with the spacer 48, and therefore, the airbag 44 inflates and expands toward the vehicle transverse direction inner side, i.e., toward the passenger D side. Thus, the initial restraining of the passenger D can be carried out at an early time. Due thereto, the passenger D restraining performance can be improved more.

Moreover, because the tear portion 42D is formed adjacent to the proximal end portion 48CB of the side wall portion 48C at the spacer 48, when the airbag 44 inflates and expands, the expansion load is inputted to the spacer 48 and is directly transmitted to the tear portion 42D. Namely, deformation of the regions, other than the tear portion 42D, at the airbag door 42AD is suppressed, and stress concentrates at the tear portion 42D. Thus, the rupture time of the tear portion 42D can be shortened. Due thereto, the expansion completion time of the airbag 44 can be expedited.

Still further, the spacer 48, which opens toward the vehicle transverse direction outer side at the time of inflation and expansion of the airbag 44, abuts the airbag 44. When impact load is inputted from the airbag 44 to the spacer 48 at the time when the airbag 44 restrains the passenger D, because the interior of the spacer 48 is hollow, deformation is possible. Due to this deformation, the spacer 48 absorbs the impact load. Namely, not only the airbag 44 that has inflated and expanded, but also the spacer 48 can be utilized as an impact absorbing member, and therefore, the impact absorbing stroke amount can be ensured sufficiently. Due thereto, the passenger D protecting performance can be improved.

Further, because the airbag door 42AD abuts the vehicle side portion at the time when the airbag 44 inflates and expands, the airbag 44 can stably take the reaction force from the vehicle side portion, via the spacer 48 and the airbag door 42AD, at the time of inflation and expansion. Due thereto, the airbag 44 can be inflated and expanded stably.

Moreover, the dimension of the opening portion 40A of the case 40 in the vehicle transverse direction is set to be larger than the dimension, in the vehicle transverse direction, of the bottom wall 40D of the case 40 that faces the opening portion 40A. Therefore, the thickness can be increased around the region, which corresponds to the opening portion 40A of the case 40, at the airbag 44 at the time of inflation and expansion.

Still further, the inflator 46 is disposed at the vehicle transverse direction substantially central portion of the bottom wall 40D of the case 40, and the center CL in the vehicle transverse direction at the opening portion 40A of the case 40 is disposed at the vehicle transverse direction inner side with respect to the center C of the inflator 46. Thus, the airbag 44 can be inflated and expanded toward the passenger D side. For these reasons, the passenger D restraining performance can be improved more.

Second Embodiment

A rear seat side airbag device 60 relating to a second embodiment of the present disclosure is described next by using FIG. 5. Note that structural portions that are the same as those of the above-described first embodiment are denoted by the same numbers, and description thereof is omitted.

Figure 5:
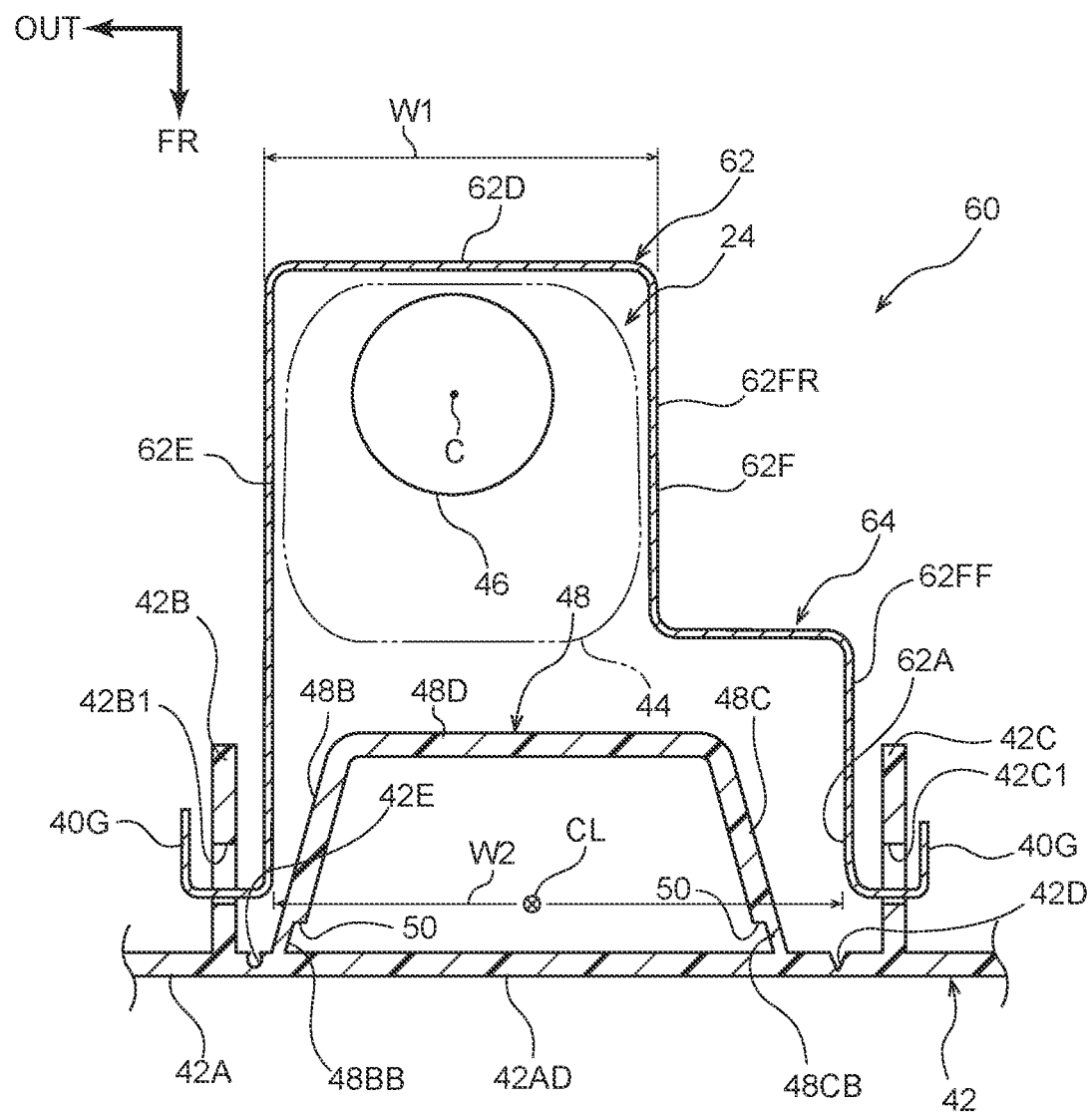
FIG. 5 is an enlarged sectional view that corresponds to FIG. 3 and shows, in an enlarged manner, a case at a rear seat side airbag device relating to a second embodiment.

As shown in FIG. 5, the basic structure of the rear seat side airbag device 60 relating to the second embodiment is similar to that of the first embodiment, and has a feature in the point that a case 62 is formed in a stepped shape.

Namely, the case 62 that accommodates the airbag module main body 24 is formed in the shape of a box having an opening portion 62A that opens toward the vehicle front side. A bottom wall 62D of this case 62 is structured so as to support the airbag 44 from the vehicle rear side. Note that the inflator 46 is disposed at the vehicle transverse direction substantially central portion of the bottom wall 62D. Further, a side wall 62E and a side wall 62F extend-out toward the vehicle front side from the vehicle transverse direction both end portions of the bottom wall 62D. The side wall 62E and the side wall 62F are disposed so as to face one another in the vehicle transverse direction. The side wall 62E extends-out toward the vehicle front side from the vehicle transverse direction outer side end portion of the bottom wall 62D. On the other hand, the side wall 62F extends-out toward the vehicle front side from the vehicle transverse direction inner side end portion of the bottom wall 62D. The side wall 62F has a step portion 64 at the vehicle longitudinal direction substantially central portion thereof. Due to this step portion 64, a vehicle front side portion 62FF of the side wall 62F is positioned at the vehicle transverse direction inner side with respect to a vehicle rear side portion 62FR of the side wall 62F. Due thereto, the case 62 is formed in a stepped shape. Accordingly, the dimension W2 of the opening portion 62A of the case 62 in the vehicle transverse direction is greater than the dimension W1 of the bottom wall 62D in the vehicle transverse direction, and the center CL of the opening portion 62A of the case 62 in the vehicle transverse direction is disposed at the vehicle transverse direction inner side with respect to the center C of the inflator 46.

The anchor claws 40G are formed at the side wall 62E and the side wall 62F, respectively. Further, these anchor claws 40G respectively anchor on the vertical wall portion 42B and the vertical wall portion 42C of the door garnish 42. Note that the bottom wall 62D of the case 62 and the wheel house inner panel 32 (see FIG. 2), are fastened together by brackets, and, due thereto, the case 62 is fixed to the wheel house 26 (see FIG. 2).

(Operation/Effects of Second Embodiment)

Operation and effects of the present embodiment are described next.

In accordance with the above-described structure as well, because the rear seat side airbag device 60 is structured similarly to the rear seat side airbag device 10 of the first embodiment other than the point that the case 62 has a stepped structure, effects that are similar to those of the first embodiment are obtained. Further, because the step portion 64 is provided only at the side wall 62F that is at the vehicle transverse direction inner side of the case 62, the airbag 44 at the time of inflation and expansion can approach the passenger D, while an increase in the volume of the case 62 interior is suppressed. Therefore, the passenger D restraining performance can be improved more.

Third Embodiment

A rear seat side airbag device 70 relating to a third embodiment of the present disclosure is described next by using FIG. 6. Note that structural portions that are the same as those of the above-described first embodiment are denoted by the same numbers, and description thereof is omitted.

Figure 6:
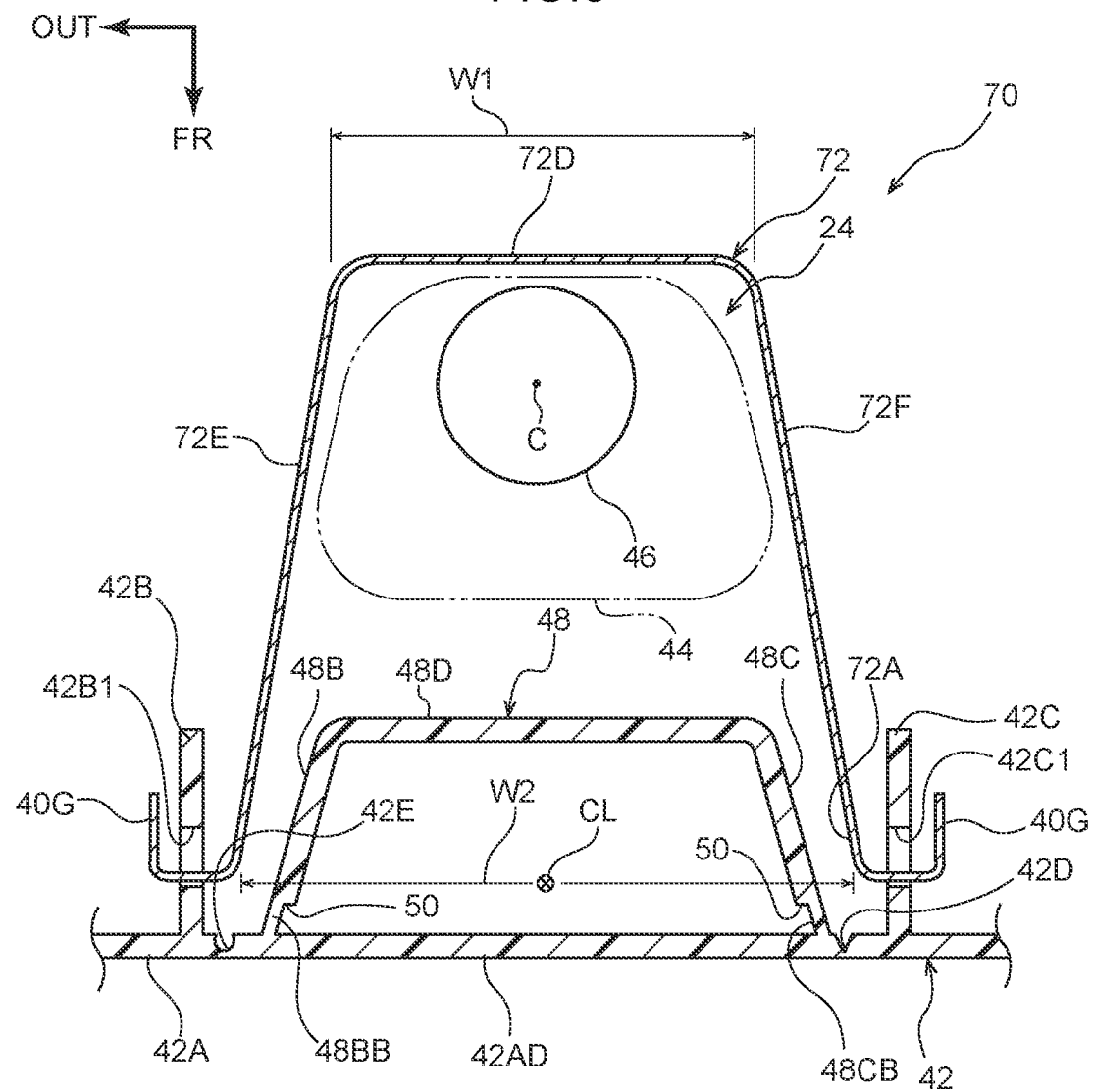
FIG. 6 is an enlarged sectional view that corresponds to FIG. 3 and shows, in an enlarged manner, a case at a rear seat side airbag device relating to a third embodiment.

As shown in FIG. 6, the basic structure of the rear seat side airbag device 70 relating to the third embodiment is similar to that of the first embodiment, and has a feature in the point that a case 72 is formed in a shape that is symmetrical to the left and the right.

Namely, the case 72 that accommodates the airbag module main body 24 is formed in the shape of a box having an opening portion 72A that opens toward the vehicle front side. A bottom wall 72D of this case 72 is structured so as to support the airbag 44 from the vehicle rear side. Note that the inflator 46 is disposed at the vehicle transverse direction substantially central portion of the bottom wall 72D. Further, a side wall 72E and a side wall 72F extend-out toward the vehicle front side from the vehicle transverse direction both end portions of the bottom wall 72D. The side wall 72E and the side wall 72F are disposed so as to face one another in the vehicle transverse direction. The side wall 72E extends-out toward the vehicle front side from the vehicle transverse direction outer side end portion of the bottom wall 72D. On the other hand, the side wall 72F extends-out toward the vehicle front side from the vehicle transverse direction inner side end portion of the bottom wall 72D. The side wall 72E and the side wall 72F are inclined so as to move away from one another while heading toward the vehicle front side. Due thereto, the case 72 has a shape that is symmetrical to the left and the right as seen in a vehicle plan view. Accordingly, the dimension W2 of the opening portion 72A of the case 72 in the vehicle transverse direction is greater than the dimension W1 of the bottom wall 72D in the vehicle transverse direction.

The anchor claws 40G are formed at the side wall 72E and the side wall 72F, respectively. Further, these anchor claws 40G respectively anchor on the vertical wall portion 42B and the vertical wall portion 42C of the door garnish 42. Note that the bottom wall 72D of the case 72 and the wheel house inner panel 32 (see FIG. 2), are fastened together by brackets, and, due thereto, the case 72 is fixed to the wheel house 26 (see FIG. 2).

(Operation/Effects of Third Embodiment)

Operation and effects of the present embodiment are described next.

In accordance with the above-described structure as well, because the rear seat side airbag device 70 is structured similarly to the rear seat side airbag device 10 of the first embodiment other than the point that the case 72 has a shape that is symmetrical to the left and the right, effects that are basically similar to those of the first embodiment are obtained. Further, due to the case 72 being formed in a shape that is symmetrical to the left and the right, the same case 72 can be used in the rear seat side airbag devices 70 that are provided at the vehicle left side and right side. Namely, the cases 72 can be used in common. Due thereto, costs can be decreased.

Fourth Embodiment

A rear seat side airbag device 80 relating to a fourth embodiment of the present disclosure is described next by using FIG. 7. Note that structural portions that are the same as those of the above-described first embodiment are denoted by the same numbers, and description thereof is omitted.

Figure 7:
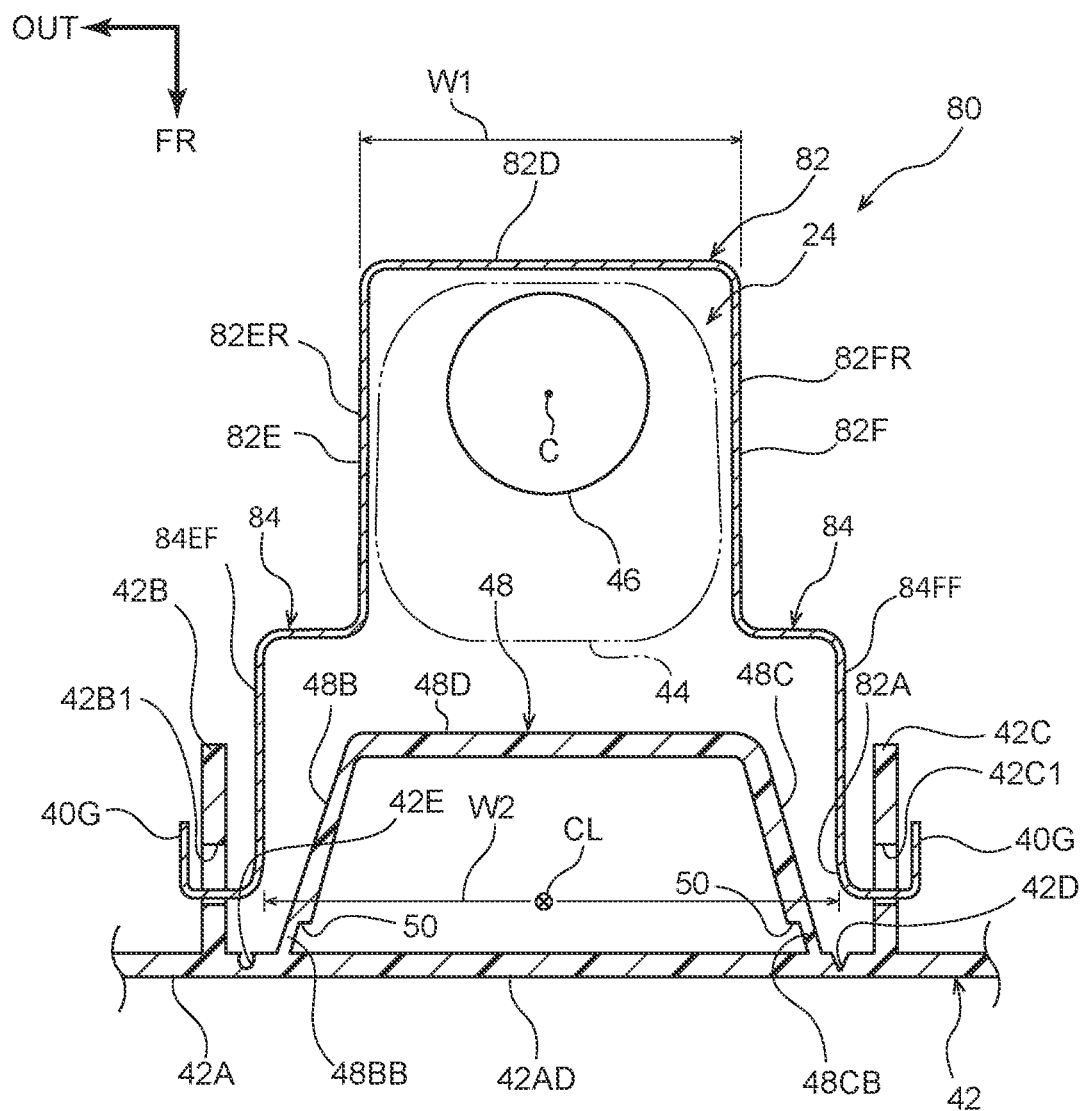
FIG. 7 is an enlarged sectional view that corresponds to FIG. 3 and shows, in an enlarged manner, a case at a rear seat side airbag device relating to a fourth embodiment.

As shown in FIG. 7, the basic structure of the rear seat side airbag device 80 relating to the fourth embodiment is similar to that of the first embodiment, and has a feature in the point that a case 82 is formed in a shape that has left-right symmetry and is stepped.

Namely, the case 82 that accommodates the airbag module main body 24 is formed in the shape of a box having an opening portion 82A that opens toward the vehicle front side. A bottom wall 82D of this case 82 is structured so as to support the airbag 44 from the vehicle rear side. Note that the inflator 46 is disposed at the vehicle transverse direction substantially central portion of the bottom wall 82D. Further, a side wall 82E and a side wall 82F extend-out toward the vehicle front side from the vehicle transverse direction both end portions of the bottom wall 82D. The side wall 82E and the side wall 82F are disposed so as to face one another in the vehicle transverse direction. The side wall 82E extends-out toward the vehicle front side from the vehicle transverse direction outer side end portion of the bottom wall 82D. On the other hand, the side wall 82F extends-out toward the vehicle front side from the vehicle transverse direction inner side end portion of the bottom wall 82D. The side wall 82E and the side wall 82F each have a step portion 84 at the vehicle longitudinal direction substantially central portion thereof. Due to this step portion 84, a vehicle front side portion 82EF of the side wall 82E is positioned at the case outer side with respect to a vehicle rear side portion 82ER of the side wall 82E. Similarly, a vehicle front side portion 82FF of the side wall 82F is positioned at the case outer side with respect to a vehicle rear side portion 82FR of the side wall 82F. Due thereto, the case 82 is formed in a stepped shape that is symmetrical to the left and the right. Accordingly, the dimension W2 of the opening portion 82A of the case 82 in the vehicle transverse direction is greater than the dimension W1 of the bottom wall 82D in the vehicle transverse direction.

The anchor claws 40G are formed at the side wall 82E and the side wall 82F, respectively. Further, these anchor claws 40G respectively anchor on the vertical wall portion 42B and the vertical wall portion 42C of the door garnish 42. Note that the bottom wall 82D of the case 82 and the wheel house inner panel 32 (see FIG. 2), are fastened together by brackets, and, due thereto, the case 82 is fixed to the wheel house 26 (see FIG. 2).

(Operation/Effects of Fourth Embodiment)

Operation and effects of the present embodiment are described next.

In accordance with the above-described structure as well, because the rear seat side airbag device 80 is structured similarly to the rear seat side airbag device 10 of the first embodiment other than the point that the case 82 is a left-right symmetrical and stepped shape, effects that are basically similar to those of the first embodiment are obtained. Further, due to the case 82 being formed in a shape that has left-right symmetry and is stepped, the thickness, within the case 82, of the airbag 44 at the time of inflation and expansion can be made to be greater than at the cases 40, 62, 72 of the first through third embodiments. Accordingly, at the time of inflation and expansion, the thickness of the region, which is positioned at the side of the passenger D, at the airbag 44 can be made to be larger. Due thereto, the restraining performance can be improved more.

Note that, in the above-described first through fourth embodiments, the tear portion 42D is disposed adjacent to the proximal end portion 48CB of the spacer 48. However, the present disclosure is not limited to this, and may be structured such that the tear portion 42D is provided at a position that is slightly apart from the proximal end portion 48CB of the spacer 48.

Further, as shown in FIG. 2, the airbag door 42AD is structured so as to abut the door trim 38 at the time when the airbag 44 inflates and expands. However, the present disclosure is not limited to this, and may be structured such that the airbag door 42AD does not abut the door trim 38.

Moreover, the dimensions, in the vehicle transverse direction, of the respective opening portions 40A, 62A, 72A, 82A of the cases 40, 62, 72, 82 are set to be greater than the dimensions, in the vehicle transverse direction, of the respective bottom walls 40D, 62D, 72D, 82D. However, the present disclosure is not limited to this, and these dimensions may be set to be substantially the same.

Still further, the vehicle transverse direction centers CL of the respective opening portions 40A, 62A of the cases 40, 62 are disposed at the vehicle transverse direction inner side with respect to the center C of the inflator 46. However, the present disclosure is not limited to this, and the vehicle transverse direction centers CL of the opening portions may be provided at substantially the same positions in the vehicle transverse direction as the center C of the inflator, or may be provided at other positions.

Further, although the interior of the spacer 48 is hollow, the present disclosure is not limited to this, and the spacer may be structured such that the state of deformation thereof can be adjusted by providing ribs at the interior thereof, or the like.

The present disclosure is not limited to the above-described exemplary forms, and, other than the above-described exemplary forms, can be implemented by being modified in various ways within a scope that does not depart from the gist thereof.

An object of the present disclosure is to provide a rear seat side airbag device that has an improved passenger restraining performance.

A first aspect of a rear seat side airbag device includes: an airbag module main body that includes a side airbag, which is inflated and expanded at a side of a position of a passenger at a rear seat at a time of a vehicle collision, and an inflator that supplies gas to an interior of the side airbag; a case that is provided at a vehicle rear side of a cabin-side wall portion, a plate thickness direction of which is a substantially vehicle longitudinal direction, of a seat side garnish disposed between a vehicle side portion and a seatback of the rear seat, that has an opening portion that opens toward the cabin-side wall portion, and that houses the airbag module main body; an airbag door that covers the opening portion, and that is surrounded by a tear portion and a hinge portion that are formed at regions corresponding to the opening portion; and a spacer that is provided at the airbag door and projects out into the case.

In accordance with the first aspect, the case, which has the opening portion that opens toward the cabin-side wall portion, is mounted to the vehicle rear side of the cabin-side wall portion, whose plate thickness direction is the substantially vehicle longitudinal direction, at the side garnish that is disposed between a vehicle side portion and the seatback of the rear seat. Accommodated at the interior of the case is the airbag module main body that is structured to include a side airbag (hereinafter simply called "airbag") that inflates and expands at the side of the passenger at the time of a vehicle collision, and an inflator that supplies gas to the airbag interior. Further, the airbag door, which covers the opening portion of the case and which is surrounded by the tear portion and the hinge portion that are formed at regions corresponding to the opening portion of the case, is provided. The spacer is provided at the airbag door, and this spacer projects-out into the case. Accordingly, the volume of the case interior can be reduced by the spacer. Thus, due to the airbag module being disposed further toward the vehicle rear side than the side garnish, even in a case in which the region, at which the thickness is the largest, of the airbag at the time of inflation and expansion is positioned at the side of the passenger, a delay in the inflation and expansion due to an increase in volume within the case can be suppressed.

A second aspect is the first aspect of the rear seat side airbag device, wherein the spacer is provided at a vehicle rear side surface of the airbag door, the hinge portion is provided at a vehicle transverse direction outer side with respect to the spacer, and a starting point of rupturing of the tear portion is provided at a vehicle transverse direction inner side with respect to the spacer.

In accordance with the second aspect, the spacer is formed at a vehicle rear side surface of the airbag door, and the hinge portion is provided at the vehicle transverse direction outer side with respect to the spacer, and the starting point of rupturing of the tear portion is provided at the vehicle transverse direction inner side with respect to the spacer. Accordingly, at the time of inflation and expansion of the airbag, because the airbag door opens toward the vehicle transverse direction outer side together with the spacer, the airbag inflates and expands toward the vehicle transverse direction inner side, i.e., toward the passenger side. Therefore, the initial restraining of the passenger can be carried out at an early time.

A third aspect is the second aspect of the rear seat side airbag device, wherein the starting point of rupturing of the tear portion is adjacent to a vehicle transverse direction inner side end portion of the spacer.

In accordance with the third aspect, because the starting point of rupturing of the tear portion is formed so as to be adjacent to the vehicle transverse direction inner side end portion of the spacer, when the airbag inflates and expands, the expansion load is inputted to the spacer, and is directly transmitted to the tear portion. Namely, deformation of regions, other than the tear portion, at the airbag door is suppressed, and stress concentrates at the tear portion. Therefore, the time over which the tear portion ruptures can be shortened.

A fourth aspect is the second aspect or the third aspect of the rear seat side airbag device, wherein, in a case in which the spacer abuts the side airbag and impact load is applied to the spacer from the side airbag at a time of inflation and expansion of the side airbag that opens toward a vehicle transverse direction outer side, the spacer plastically deforms.

In accordance with the fourth aspect, the spacer, which opens toward the vehicle transverse direction outer side at the time of inflation and expansion of the airbag, abuts the airbag. Then, when impact load is inputted from the airbag to the spacer at the time when the airbag restrains the passenger, the spacer plastically deforms, and, due thereto, impact load is absorbed. Namely, not only the airbag that has inflated and expanded, but also the spacer can be utilized as an impact absorbing member, and therefore, the impact absorbing stroke amount can be ensured sufficiently.

A fifth aspect is any of the first to fourth aspect of the rear seat side airbag device, wherein the airbag door abuts the vehicle side portion in a case in which the side airbag inflates and expands.

In accordance with the fifth aspect, because the airbag door abuts the vehicle side portion at the time of inflation and expansion of the airbag, the airbag can stably take the reaction force from the vehicle side portion via the spacer and the airbag door at the time of inflation and expansion.

A sixth aspect is any of the first to fifth aspect of the rear seat side airbag device, wherein a dimension, in a vehicle transverse direction, of the opening portion is set to be larger than a dimension, in the vehicle transverse direction, of a bottom wall of the case that faces the opening portion.

In accordance with the sixth aspect, the dimension, in the vehicle transverse direction, of the opening portion of the case is set to be greater than the dimension, in the vehicle transverse direction, of the bottom wall of the case that faces the opening portion. Therefore, the thickness can be increased around the region, which corresponds to the opening portion of the case, at the airbag at the time of inflation and expansion.

A seventh aspect is the sixth aspect of the rear seat side airbag device, wherein: the inflator is disposed at a vehicle transverse direction substantially central portion of the bottom wall, and a vehicle transverse direction center of the opening portion is disposed at a vehicle transverse direction inner side with respect to a center of the inflator.

In accordance with the seventh aspect, the inflator is disposed at the vehicle transverse direction substantially central portion of the bottom wall of the case. The vehicle transverse direction center of the opening portion of the case is disposed at the vehicle transverse direction inner side with respect to the center of the inflator. Therefore, the airbag can be inflated and expanded toward the passenger side.

The rear seat side airbag device of the first aspect can improve the passenger restraining performance.

The rear seat side airbag device of the second aspect can further improve the passenger restraining performance.

The rear seat side airbag device of the third aspect can expedite the expansion completion time of the airbag.

The rear seat side airbag device of the fourth aspect can improve the passenger protecting performance.

The rear seat side airbag device of the fifth aspect can inflate and expand the airbag stably.

The rear seat side airbag devices of the sixth and seventh aspects can improve the passenger restraining performance even more.

What is claimed is:

1. A rear seat side airbag device comprising:
    an airbag module main body disposed at a vehicle rear side of a cabin-side wall portion of a side garnish, the cabin-side wall portion having a plate thickness direction in a vehicle longitudinal direction, the side garnish being disposed between a vehicle side portion and a seatback of the rear seat, the airbag module main body including:
        a side airbag configured to be inflated and expanded at a side of a position of a passenger at a rear seat at a time of a vehicle collision, and
        an inflator configured to supply gas to an interior of the side airbag;
    a case disposed at the vehicle rear side of the cabin-side wall portion of the side garnish, the case housing the airbag module main body and including an opening portion configured to open toward the cabin-side wall portion, a width of the opening portion in a vehicle transverse direction is larger than a width of a bottom wall of the case extending in the vehicle transverse direction, the bottom wall of the case facing the opening portion, and the width of the opening portion being defined by a first side wall and a second side wall of the case, the first side wall and the second side wall extending from the bottom wall;
    an airbag door covering the opening portion and surrounded by a tear portion and a hinge portion formed at regions corresponding to the opening portion; and
    a spacer disposed on the airbag door and projecting into the case,
    wherein:
        the inflator is disposed at a central portion of the bottom wall with respect to the vehicle transverse direction, and
        a center of the opening portion with respect to the vehicle transverse direction is disposed at a vehicle transverse direction inner side with respect to a center of the inflator.

2. The rear seat side airbag device of claim 1, wherein:
    the spacer is disposed on a vehicle rear side surface of the airbag door,
    the hinge portion is disposed at a vehicle transverse direction outer side with respect to the spacer, and
    a rupture starting point of the tear portion is provided at a vehicle transverse direction inner side with respect to the spacer.

3. The rear seat side airbag device of claim 1, wherein, upon the side airbag inflating and expanding toward a vehicle transverse direction outer side, (i) the spacer abuts the side airbag, (ii) the spacer receives an impact load toward the vehicle transverse direction outer side from the side airbag, (iii) the spacer plastically deforms, and (iv) the airbag door abuts the vehicle side portion upon the side airbag inflating and expanding such that the deformed spacer and the airbag door are pressed between the airbag and the side wall portion.

4. The rear seat side airbag device of claim 1, wherein the airbag door is configured to abut the vehicle side portion upon the side airbag inflating and expanding.

5. The rear seat side airbag device of claim 1, wherein a width of the opening portion in a vehicle transverse direction is larger than a width of a bottom wall of the case in the vehicle transverse direction, the bottom wall of the case facing the opening portion.

6. The rear seat side airbag device of claim 1, wherein, in a view from a vehicle upper side, the case includes:
   the first side wall being orthogonal to the bottom wall, the first side wall extending toward a vehicle front side from a first end at a vehicle transverse direction outer side of the bottom wall, and
   the second side wall extending toward the vehicle front side from a second end at a vehicle transverse direction inner side of the bottom wall, the second side wall being inclined away from the first side wall.

7. The rear seat side airbag device of claim 6, wherein the second side wall is the only wall of the rear seat side airbag device inclined away from the first side wall.

8. The rear seat side airbag device of claim 1, wherein, in a view from a vehicle upper side, the case includes:
   the first side wall being orthogonal to the bottom wall extending in the vehicle transverse direction, the first side wall extending toward a vehicle front side from a first end at a vehicle transverse direction outer side of the bottom wall, and
   the second side wall being orthogonal to the bottom wall, the second side wall extending toward the vehicle front side from a second end at a vehicle transverse direction inner side of the bottom wall, and the second wall having a step extending in the vehicle transverse direction and widening a distance between the second side wall and the first side wall.

9. The rear seat side airbag device of claim 8, wherein the second side wall is the only wall of the rear seat side airbag device having a step.

* * * * *